May 27, 1969     R. OGER     3,446,081
ELASTIC MOUNTED GYROSCOPE MOTOR

Filed March 8, 1967

INVENTOR
RENÉ OGER

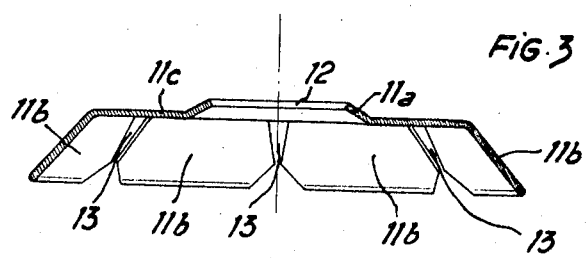
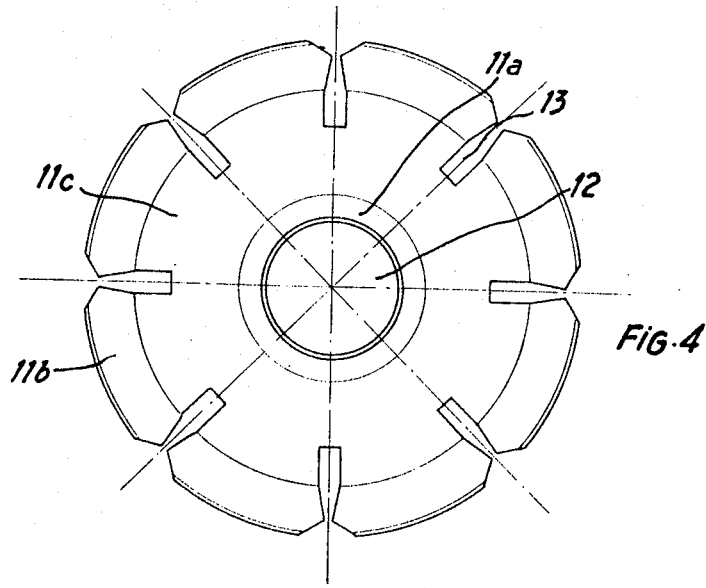

United States Patent Office 3,446,081
Patented May 27, 1969

3,446,081
ELASTIC MOUNTED GYROSCOPE MOTOR
René Oger, Paris, France, assignor to Societe de Fabrication d'Instruments de Mesure (S.F.I.M.), Massy, France, a French company
Filed Mar. 8, 1967, Ser. No. 621,646
Claims priority, application France, Mar. 11, 1966, 53,063
Int. Cl. G01c 19/08
U.S. Cl. 74—5.7    9 Claims

ABSTRACT OF THE DISCLOSURE

The invention relates to a gyroscope with a rotor integral with a flywheel. A stator is mounted on pivots on the axis of rotation of the flywheel. The stator is mounted on the pivots by expansion joints. Each joint includes a diaphragm with a central frustoconical portion defining a central opening in the diaphragm and a peripheral frustoconical portion joined to the central portion by an intermediate ring. This arrangement enables the expansion of the stator to be absorbed elastically and symmetrically.

---

This invention relates to improvements in gyroscopes.

The general object of these improvements is to increase the stability of the centre of gravity of the top of the gyroscope relative to the suspension axes.

Another object of the invention is to minimise to the greatest possible extent the time required to immobilise this centre of gravity once the gyroscope is in operation.

The invention thus provides a gyroscope of high performance and long service life.

According to the invention, these objects are achieved on the one hand by a new system of mounting the stator of the gyroscope motor and, on the other hand, by reducing the number of working parts by means of which the flywheel of the gyroscope is mounted on the suspension ring.

The invention essentially comprises mounting the stator on its axis by means of expansion joints. This axis is preferably defined by two pivots which on the one hand are fixed to the suspension ring and on the other hand are used for the rotatable mounting of brackets which themselves are fixed to the flywheel of the gyroscope. The shape of the suspension ring very closely follows that of the flywheel, the assembly as a whole being accommodated in a closed casing fixed to the ring with a minimum number of contact points.

One embodiment of the invention is illustrated solely by way of example in the accompanying drawings in which:

FIGURES 3 and 4 are respectively a section through and a plan view of one embodiment of the expansion joints provided in accordance with the invention for mounting the stator.

Figure 1:
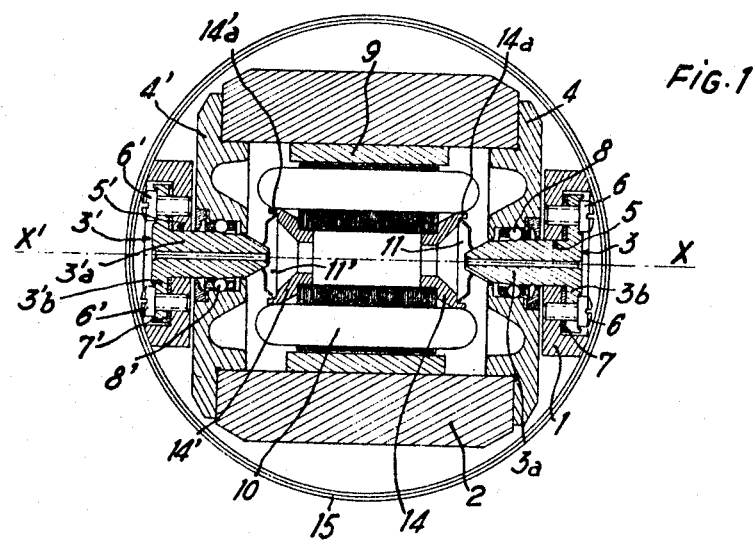
FIGURE 1 is a section through those element of the gyroscopes to which the invention can be applied, showing how the flywheel is mounted on the suspension ring or frame.

In FIGURE 1, which is a section through those parts of a gyroscope embodying the features of the invention, the reference 1 denotes the suspension frame or ring (for example the locating frame in the case of a directional gyroscope) of the gyroscope, whilst 2 is the flywheel of the gyroscope.

According to the invention, the flywheel 2 is connected to the suspension ring 1 by means of a significantly small number of simple parts essentially comprising at each of the two ends of the flywheel, a pivot 3 (3′) fixed to the ring, and a bracket 4 (4′) fixed to the flywheel, being mounted for rotation on the pivot.

In the example shown, the pivot 3 (3′) has a front part 3a (3a′) in the form of a pin or spindle which projects into an opposite opening 5 (5′) in the ring 1, and a rear part 3b (3b′) in the form of a flange which is fixed to the ring by removable fastening means, for example in the form of screws 6 (6′). A shim 7 (7′) may with advantage be arranged between the flange 3b (3b′) of the pivot and the face of the ring towards which the flange is pressed, in order precisely to define the relative axial positions of the ring and pivot along the axis of the latter. Appropriate choice of the thickness of the shim enables the extent to which the pivot projects inside the flywheel to be controlled as desired for a given ring.

The brackets 4 and 4′ may be secured to the two ends of the flywheel by any appropriate means, for example by binding or bedding.

The bracket 4 (4′) is mounted for rotation on the pivot 3 (3′) by means of a bearing arranged around the pivot inside a central bore in the bracket extending through the pivot. The rollers 8 (8′), usually balls as in the case illustrated, travel in races which are preferably formed in the pivot itself on the one hand and in the wall of the bore in the bracket on the other hand, but which may also be formed in rings subsequently fitted both on the pivot and on the bracket by bedding or the like.

Among the various types of bearing which may be used for rotatably mounting the bracket on the pivot, it is preferred in accordance with the invention to use a sealed bearing to avoid loss of lubricant when the gyroscope is in operation.

In a word, the flywheel is mounted for rotation on the suspension ring by means of a shim, a pivot, a bearing and a bracket at each of the two ends of the flywheel.

The mounting systems are identical at these two ends so that the two pivots are coaxial since according to the invention their common axis X—X′ has to define an axis of rotation for the flywheel.

For this purpose, the motor driving the flywheel, whose rotor 9 is fixed to the flywheel, comprises a stator 10 which is mounted on the aforementioned pivots.

According to the invention, the stator is mounted on the pivots by way of means enabling the expansion of the stator to be absorbed both elastically and symmetrically. These means may comprise for each pivot an expansion joint by means of which the stator is mounted on the pivot.

According to the invention, this expansion joint is also self-centring. In addition, the self-centring expansion joint which, before fitting, is both radially and axially elastic, is intended to retain after fitting a level of axial elasticity greater, for example twenty times greater than its radial elasticity.

This expansion joint may consist of a washer 11 (11′) of which FIGURES 3 and 4 show one nonlimiting embodiment on an enlarged scale, FIGURE 3 being a section and FIGURE 4 a plan view. This washer 11 (11′) is shown in position in FIGURE 1.

The washer 11, generally frustoconical in shape 12, has an opening at its centre 12 by means of which it is mounted on the pin or spindle 3a of the corresponding pivot, preferably on a conical portion thereof. Accordingly, it is of advantage to define the opening 12 by means of a small frustoconical wall 11a of the washer and to form slots 13 around the periphery of the main wall 11b of the washer to make it suitably elastic.

An adequate level of axial elasticity is for example around 40 microns per kg. (before the washer is fitted).

Thus, the slotted conical washers 11, 11' form in accordance with the invention diaphragms which absorb reading variations due to the sum of the tolerances of the components in the axial direction, which give the required axial prestressing (for example an average axial prestress of 2 kg.), which have a linear axial elasticity (after fitting) governed by the load and which eliminate the axial play of the stator, immobilising it in the radial direction and preventing it from rotating, even in the event of vibration.

Figure 2:
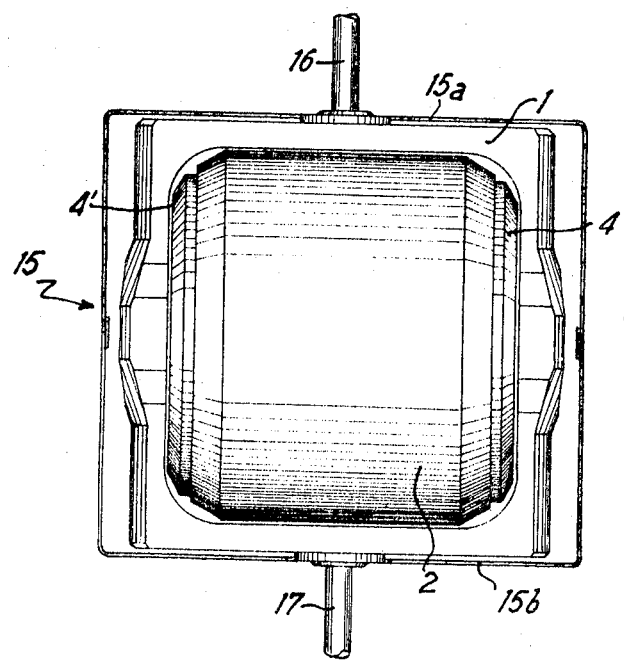
FIGURE 2 is a view of these elements on a plane perpendicular to the sectional plane of FIGURE 1, showing the suspension axis of the suspension ring.

The shape of the washers as shown in the drawings enables all the advantages mentioned above to be obtained; the inner cone 11a of the washers provides them with sufficient rigidity to be mounted on the cone of the pivot without collapsing, and to minimise any errors in movement; the outer slotted ring 11b enables sufficient elasticity to be obtained to eliminate radial play and to centre the stator. As shown in FIGURES 2 and 3, these two conical parts are joined in this embodiment by a flat intermediate ring 11c which provides the washer with sufficient axial elasticity after it has been fitted.

It will be appreciated that the invention is not limited to the use of such a washer and that any equivalent means performing the same function may be used.

The washer 11 (11') is fitted and bedded in position in the bore of the stator either directly or indireclty, as in the case illustrated, in which case it is of advantage in accordance with the invention to arrange between the washer and the stator an intermediate ring 14 (14') fixed in position in the bore of the stator by any suitable means, for example by bedding it in the plates of the stator, or by crimping it. The ring may also be driven on to a solid or hollow spindle extending through the stator.

According to the invention, a ring of this kind or any other intermediate element between the washer and the stator is machined after it has been fitted in position to that is span (in the case illustrated, the shoulder 14a (14a') is exactly centred on the axis of the stator.

It will be appreciated that an intermediate element is easier to machine than the inside of the stator itself and this is one of the reasons why it is preferred to use an element of this kind instead of making the expansion joint rest directly on the stator.

The diameter defined by the shoulder 14 (14ª') is of course selected to correspond to the matching dimensions of that part of the washer 11 (11') which has to fit into the ring 14 (14').

In the embodiment shown, the stator 10 is thus mounted so to speak between points on the pivots 3 and 3' instead of being mounted on the shaft, as is the case with conventional gyroscopes.

It should be noted that the effects of the expansion joints provided in accordance with the invention for mounting the stator on the means defining an axis of rotation through the flywheel of the gyroscope, are the same and that this axis is defined by a single spindle or by two points although the system of mounting on pivots as illustrated has one additional advantage over spindle-mounting, which will be discussed in the following.

This advantage related to the stabilisation of the axial prestressing of the bearing mounted between the pivots and the brackets during the period of heating. This stabilisation is dependent upon the identity of the expansions which those components whose mounting defines the position or roller bearings undergo.

The motor of the gyroscope provides a heat source intended to heat the components surrounding it, in particular the flywheel 2, the brackets 4 and 4', the pivots 3 and 3' and the ring 1. These components have identical rates of expansion providing they have the same coefficient of linear expansion and providing their temperatures are identical. Coefficients of expansion as close as possible to one another may be given to the components by suitably choosing their constituent materials, whilst the identity of their expansions is ultimately governed by the uniformity of their temperatures. This uniformity is guaranteed by effective ventilation of the components 2, 4 and 1.

In the case of a gyroscope, the stator or whose motor is carried by a shaft in one piece, there is no guarantee for uniformity of temperature and it is impossible effectively to cool the shaft.

Thus in the case of a gyroscope, the stator of whose motor is carried by a shaft in one piece, the considerable fluctuations in temperature to which the shaft is exposed modify the prestressing of the bearing and thus cause displacements of the centre of gravity. In addition, the heat generated in the stator is transmitted by conduction along the shaft to the roller bearings whose temperature is thus raised to an excessively high level for operation.

These disadvantages do not attend the gyroscope according to the invetion where the shaft is reduced to two pivots and where the suspension ring acts as a cushion or support for the prestressing of the bearing (controllable by the width of the shims 7) which in itself constitutes one advantageous feature of the invention insofar as, in conventional gyroscope, the shaft extending through the stator acts as a support for prestressing the bearings, the corresponding countersupport being provided by the flywheel.

Thus, it is posible by virtue of the invention mechanically and thermally to insulate the bearings of the stator.

Another feature of the invention for obtaining uniform temperatures is embodied in the arrangement of the flywheel suspension ring assembly in a closed casing which only touches the ring at a minimum number of points at which it is fixed to the ring. Taken together, these points form a contact surface preferably smaller than 3 cm.$^2$ and, to greater advantage, smaller than 1 cm.$^2$.

One embodiment of this casing is shown at 15 in FIGURES 1 and 2. In this case, the casing is formed by two cylindrical half shells 15a, 15b each being formed at its bottom with an opening for the passage of one of the two half shafts 16, 17 which define the suspension axis of the top of the gyroscope, the locating axis in the case of a directional gyroscope.

It can also be seen from FIGURES 1 and 2 that, according to the invention, the suspension ring 1 is generally rectangular in shape, following the outline of the flywheel 2 as closely as possible.

This ring or frame may be cut from a circular blank whose drawing direction corresponds to the suspension axis defined by the two half-shafts 16 and 17, screws 6, 6' for establishing balance and pendularity being with advantage countersunk in the hollow parts of the ring as shown in FIGURE 1.

If the embodiment of the gyroscope which has been described and illustrated is particularly advantageous, due in particular to the significantly small number of its constituent parts, their simplicity, the outstanding level of stability imparted to the centre of gravity with respect to the suspension axes, and the speed with which the centre of gravity is immobilised in relation to these axes once the gyroscope is in operation, it will be appreciated that various modifications of this gyroscope may be made simply by applying selected features of the invention which would be retained as essential.

What is claimed is:

1. A gyroscope comprising a suspension ring carrying two coaxial pivots which define an axis of rotation, a flywheel mounted on said pivots for rotation around said axis, and a motor for rotating said flywheel, said motor having a rotor fixed to said flywheel and a stator located within said rotor and symmetrically mounted on said two pivots through elastic mounting means which comprise for each said pivot a radially and axially elastic joint between the pivot and the stator.

2. A gyroscope according to claim 1 wherein each said joint comprises a diaphragm which is coaxially mounted on the pivot and fixed to said stator.

3. A gyroscope according to claim 1 wherein said diaprhragm has a central frustoconical portion defining a central opening by means of which the diaphragm is mounted on the pivot and a coaxial peripheral frustonical portion defining the circumference of the diaphragm, the two frustoconical portions being joined by a substantially radial intermediate ring portion, and said peripheral portion being formed with slots.

4. A gyroscope comprising a suspension ring carrying two coaxial pivots which define an axis of rotation, a flywheel mounted on said pivots for rotation around said axis, and a motor for rotating said flywheel, said motor having a rotor fixed to said flywheel for rotation therewith and a stator located within said rotor and mounted on the said pivots through elastic mounting means which comprise, for each pivot, a radially and axially elastic diaphragm mounted on the pivot and fixed to said stator, said diaphragm having a central frustoconical portion defining a central opening by means of which the diaphragm is mounted on the pivot and a coaxial peripheral frustoconical portion defining the circumference of the diaphragm, the two frustoconical portions being joined by a substantially radial intermediate ring portion, a plurality of slots formed in said peripheral portion, and a mounting ring secured to the stator and having a wall which is coaxial with said axis, said diaphragm being fixed to said ring with peripheral portion engaging said wall to support said stator on said pivots.

5. A gyroscope comprising a suspension ring carrying two coaxial pivots which define an axis of rotation, a flywheel mounted on said pivots for rotation around said axis through mounting means which comprise, for each pivot, a bracket fixed to an axial end of said flywheel and rotatably mounted on the pivot by means of a bearing whose races extend around the outer periphery of the pivot and around the inner periphery of the pivot and around the inner periphery of a bore in said bracket through which the pivot extends, and a motor for rotating said flywheel, said motor having a rotor fixed to said flywheel and a stator supported by said pivots through elastic means, said elastic means comprising, for each pivot, a washer having a central opening fitted on said pivot and a peripheral portion fixed to said stator near one axial end thereof.

6. A gyroscope as claimed in claim 5 wherein said suspension ring has a pair of bores formed therein, a pivot member extending through each of said bores, and means for enabling the relative axial position of the pivots and the ring to be adjusted.

7. A gyroscope as claimed in claim 5 wherein each said pivot extends through the wall of the ring and is fixed to it by adjusting means enabling the relative positions of the pivot and ring along said axis to be adjusted.

8. A gyroscope as claimed in claim 7 wherein the adjusting means comprise a shim and locking screws.

9. A gyroscope as claimed in claim 7 wherein the flywheel and suspension ring are mounted in a casing formed of two cylindrical half-shells each having at one end an opening for the passage of a suspension half-shaft.

References Cited

UNITED STATES PATENTS

| | | | |
|---|---|---|---|
| 2,193,531 | 3/1940 | Esval | 310—67 X |
| 2,895,666 | 7/1959 | Girdwood et al. | 310—67 X |
| 3,157,053 | 11/1964 | Hall | 74—5.7 |
| 3,361,914 | 1/1968 | Janssen | 310—51 |
| 3,365,960 | 1/1968 | Siff et al. | 74—5 X |

ROBERT A. O'LEARY, *Primary Examiner.*

WILLIAM E. WAYNER, *Assistant Examiner.*

U.S. Cl. X.R.

74—5